(12) United States Patent
Xue et al.

(10) Patent No.: US 9,448,984 B2
(45) Date of Patent: Sep. 20, 2016

(54) KEYBOARD TYPE TERMINAL AND LOCATION METHOD FOR ELECTRONIC DOCUMENT THEREIN

(75) Inventors: Tao Xue, Shenzhen (CN); Weidong Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 254 days.

(21) Appl. No.: 14/234,631

(22) PCT Filed: Nov. 10, 2011

(86) PCT No.: PCT/CN2011/082035
§ 371 (c)(1),
(2), (4) Date: Feb. 21, 2014

(87) PCT Pub. No.: WO2012/151887
PCT Pub. Date: Nov. 15, 2012

(65) Prior Publication Data
US 2014/0157111 A1 Jun. 5, 2014

(30) Foreign Application Priority Data
Jul. 26, 2011 (CN) .......................... 2011 1 0210870

(51) Int. Cl.
*G06F 17/00* (2006.01)
*G06F 17/22* (2006.01)
(Continued)

(52) U.S. Cl.
CPC ......... *G06F 17/2247* (2013.01); *G06F 3/0489* (2013.01); *G06F 15/0291* (2013.01); *G06F 17/212* (2013.01)

(58) Field of Classification Search
None
See application file for complete search history.

(56) References Cited

U.S. PATENT DOCUMENTS 6,331,867 B1 12/2001 Eberhard
6,411,973 B1 6/2002 Yianilos
(Continued)

FOREIGN PATENT DOCUMENTS

CN 101325764 A 12/2008
CN 101354727 A 1/2009
(Continued)

OTHER PUBLICATIONS

International Search Report in international application No. PCT/CN2011/082035, mailed on May 3, 2012. (3 pages—see entire document).

(Continued)

*Primary Examiner* — Keith Bloomquist
(74) *Attorney, Agent, or Firm* — Oppedahl Patent Law Firm LLC

(57) ABSTRACT

A keyboard type terminal and a location method for electronic document therein are disclosed. The keyboard type terminal includes a setting module, a directory listing module, a detection module, a real-time directory module, a preview module and a chapter and section switchover module. The method includes: a directory listing is generated for an electronic document and the directory listing is stored; a keyboard input is detected under a reading interface of a current chapter and section of the electronic document; in response to a to-be-switched chapter and section number inputted from a user, the to-be-switched chapter and section number is immediately matched with directory entries in the stored directory listing, and the matched directory entry is displayed; a preview of a chapter and section corresponding to the to-be-switched chapter and section number is generated according to the to-be-switched chapter and section number inputted by the user, and the preview of the chapter and section is displayed to the user; and in response to a confirmation of switching to the chapter and section from the user, the previewed section is switched to. The disclosure is easy to use and implement, and improves the reading experience.

15 Claims, 3 Drawing Sheets

(51) Int. Cl.
*G06F 15/02* (2006.01)
*G06F 17/21* (2006.01)
*G06F 3/0489* (2013.01)

(56) References Cited

U.S. PATENT DOCUMENTS

| | | | |
|---|---|---|---|
| 8,621,390 B1 * | 12/2013 | Findley | G06F 15/0291 715/818 |
| 2003/0020761 A1 | 1/2003 | Yanatsubo | |
| 2005/0091612 A1 | 4/2005 | Stabb | |
| 2005/0243658 A1 * | 11/2005 | Mack | G04G 9/0082 368/223 |
| 2007/0300176 A1 | 12/2007 | Fischer | |
| 2008/0222552 A1 | 9/2008 | Batarseh | |
| 2008/0288894 A1 | 11/2008 | Han | |
| 2010/0083162 A1 | 4/2010 | Hernandez | |
| 2010/0241648 A1 * | 9/2010 | Ito | G06F 17/30112 707/765 |
| 2010/0293498 A1 | 11/2010 | Maxfield | |
| 2011/0055691 A1 | 3/2011 | Carlen | |
| 2011/0074699 A1 | 3/2011 | Marr et al. | |
| 2011/0154260 A1 | 6/2011 | Wang | |
| 2011/0289457 A1 | 11/2011 | Li et al. | |
| 2012/0102425 A1 * | 4/2012 | Song | G06F 3/04855 715/776 |
| 2012/0240074 A1 | 9/2012 | Migos | |
| 2013/0007653 A1 | 1/2013 | Stolyarov et al. | |
| 2014/0250394 A1 | 9/2014 | Han et al. | |

FOREIGN PATENT DOCUMENTS

| | | |
|---|---|---|
| CN | 101853127 A | 10/2010 |
| CN | 101888425 A | 11/2010 |
| CN | 101976169 A | 2/2011 |
| CN | 102012905 A | 4/2011 |
| CN | 102033698 A | 4/2011 |
| JP | 2006215819 A | 8/2006 |
| JP | 2006350649 A | 12/2006 |
| JP | 2008117310 A | 5/2008 |
| JP | 2009521754 A | 6/2009 |
| JP | 2013503386 A | 1/2013 |
| TW | 573260 B | 1/2004 |
| WO | 9312490 A1 | 6/1993 |
| WO | 0141018 A2 | 6/2001 |
| WO | 2011025642 A1 | 3/2011 |
| WO | 2011075316 A1 | 6/2011 |

OTHER PUBLICATIONS

English Translation of the Written Opinion of the International Search Authority in international application No. PCT/CN2011/082035, mailed on May 3, 2012. (5 pages—see entire document).
International Search Report in international application No. PCT/CN2011/081372, mailed on Apr. 19, 2012.
English Translation of the Written Opinion of the International Search Authority in international application No. PCT/CN2011/081372, mailed on Apr. 19, 2012.
Google Japan Blog, mailed on Nov. 10, 2010.
Supplementary European Search Report in European application No. 11865030.8 mailed on Mar. 30, 2015.
Office Action for JP2014-5219907 Routing Date Mar. 24, 2015.
English Translation of Office Action for JP2014-5219907 Routing Date Mar. 24, 2015.
Supplementary European Search Report in European application No. 11865164.5, mailed on Nov. 12, 2015.

* cited by examiner

Fig. 2

Chapter 1 The definition of aesthetics
    The so-called aesthetics refers to ****************************************************************************************,
therefore, the aesthetics is easy to find in our daily life.

a

Chapter 1 The definition of aesthetics
    ......
    It's a long history for the aesthetics to come into being,*********************************************************. It is rich in cultural heritage.

b

Chapter 1 The definition of aesthetics
    ......
    There's been no complete definition for the aesthetics. The meanings of the aesthetics, which are affected by various factors including histories, cultures, national conditions, customs, regions, weathers and so on, should be treated in different ways c

KEYBOARD TYPE TERMINAL AND LOCATION METHOD FOR ELECTRONIC DOCUMENT THEREIN

TECHNICAL FIELD

The disclosure relates to the field of communications, and particularly to a keyboard type terminal and a location method for an electronic document therein.

BACKGROUND

With continuous development of communication technology, more and more wireless terminal devices are stepping into people's life. These wireless mobile terminal devices have greatly changed people's reading modes due to convenient to carry and mobility, and electronic reading becomes more and more popular.

During displaying and reading of an electronic document on an existing mobile terminal, a locating operation during reading of the electronic document is usually performed through keys. For example, an application on a mobile phone scans a full text in advance, and generates a numbered list of chapters and sections of the full text, and then a user selects a required chapter and section through direction keys. Such an operation seems reasonable but actually brings bad user experience. For example, if the user is reading a novel document or a technical document with many pages, since a chapter list is too long and chapters that need to be browsed have a relatively large span, the user often has to press the direction key continuously for page turning to look for the required chapter and section when switching needs to be performed repeatedly among different chapters and sections. Such an operation mode is usually inconvenient with a low switching efficiency.

Another method for locating a document is to insert a bookmark, and a user selects different bookmarks to perform switching. However, the method also has some problems. Since a bookmark is stored by recording a text fragment and displaying the text fragment to the user as a bookmark. If too many bookmarks are stored or when a chapter and section to which a position to be switched is located cannot be confirmed effectively through a text fragment of a bookmark, the document cannot be located and switched rapidly.

SUMMARY

The disclosure is intended to provide a keyboard type terminal and a location method for an electronic document therein, so as to solve the problem of low-efficiency switching and inaccuracy locating among chapters of an existing location method for an electronic document in a terminal.

The disclosure provides a location method for an electronic document in a keyboard type terminal, which includes:
 a directory listing is generated for an electronic document and the directory listing is stored;
 a keyboard input is detected under a reading interface of a current chapter and section of the electronic document;
 in response to a to-be-switched chapter and section number inputted from a user, the to-be-switched chapter and section number is immediately matched with directory entries in the stored directory listing, and the matched directory entry is displayed;
 a preview of a chapter and section corresponding to the to-be-switched chapter and section number is generated according to the to-be-switched chapter and section number inputted by the user, and the preview is displayed; and
 in response to a confirmation of switching to the chapter and section from the user, the previewed chapter and section is switched to.

Preferably, a format of the chapter and section number may take a format of one of the following: a number, a combination of numbers, a combination of a preset letter and a number, a combination of a preset symbol and a number, or a combination of a preset symbol and a preset letter.

Preferably, in the method, a default input sequence of the chapter and section number inputted by the user may be represented by default as both from a large unit to a small unit in the directory listing and from a small unit to a large unit.

Preferably, a separator may be provided between chapter and section numbers.

Preferably, the separator may be a preset punctuation mark or a space character.

Preferably, the process that the preview of the chapter and section corresponding to the to-be-switched chapter and section number is generated according to the to-be-switched chapter and section number inputted by the user, and the preview of the chapter and section is displayed may specifically include:
 the number of matched directory entries is determined according to the to-be-switched chapter and section number; when there is one matched directory entry, a preview of a chapter and section corresponding to the directory entry and the preview of the chapter and section is displayed to the user; when there are two or more matched directory entries, it waits the user to select a to-be-switched chapter and section from the matched directory entries, and in response to the selection of the user, a preview of the selected chapter and section is generated and displayed to the user.

Preferably, when the generated preview is displayed to the user, the method may further include: it is judged whether the user completes the confirmation of the to-be-switched chapter and section within a preset period of time; and when no confirmation of the to-be-switched chapter and section is received from the user within the preset period of time, the preview is ended and the reading interface of the current chapter and section is returned to.

Preferably, the process that in response to a to-be-switched chapter and section number inputted from a user, the to-be-switched chapter and section number is immediately matched with directory entries in the stored directory listing and the matched directory entry is displayed may include: the matched directory entry and all directory entries to which the matched directory entry is belonged are displayed together to the user in a form of a list.

Preferably, the matched directory entry may be set as an available state, and all directory entries to which the matched directory entry is belonged may be set as an unavailable state.

Preferably, the directory listing may be displayed to the user in a scrollable form.

Preferably, the preview of the section may include a title of the chapter and section, and content of a default paragraph excerpted from the chapter and section or a paragraph preset by the user.

The disclosure further provides a keyboard type terminal, which includes a directory listing module, a detection module, a real-time directory module, a preview module and a chapter and section switchover module, wherein the directory listing module is configured to generate a directory listing for an electronic document and store the directory listing;

the detection module is configured to detect a keyboard input;

the real-time directory module is configured to, in response to a to-be-switched chapter and section number inputted from a user, immediately match the to-be-switched chapter and section number with directory entries in the stored directory listing, and display the matched directory entry;

the preview module is configured to generate a preview of a chapter and section corresponding to the to-be-switched chapter and section number according to the to-be-switched chapter and section number inputted by the user, and display the preview of the chapter and section to the user; and the chapter and section switchover module is configured to, in response to a confirmation of switching to the chapter and section from the user, switch to the chapter and section previewed by the preview module.

Preferably, the terminal may further include a setting module configured to set a format and an input sequence for the to-be-switched chapter and section number, a separator, and a source of an excerpt from the preview for the user, and provide an interface and an option of a preset period of time for the user.

Preferably, the detection module may be configured to, after the to-be-switched chapter and section number is inputted, judge whether the user completes the confirmation of the to-be-switched chapter and section within the preset period of time; and the preview module may be configured to judge the number of directory entries matched by the real-time directory module; and when a directory entry is matched by the real-time directory module, directly generate a preview of a chapter and section corresponding to the directory entry and display the preview of the chapter and section to the user, and when two or more directory entries are matched by the real-time directory module, wait the user to select a to-be-switched chapter and section from the matched directory entries, and in response to the selection of the user, generate the preview of the selected chapter and section and display the preview of the selected chapter and section to the user.

With the disclosure, the user can accurately locate a desired chapter and section by inputting the chapter and section number of a to-be-switched chapter and section and read the desired chapter and section, without setting a bookmark and without searching by browsing a directory, thus greatly improving reading experience. The disclosure is simple to operate and easy to implement.

BRIEF DESCRIPTION OF THE DRAWINGS

FIG. 2 is a schematic diagram illustrating the preview of a certain first chapter in an electronic document according to the disclosure.

DETAILED DESCRIPTION

In order to make the technical problem to be solved, the technical solution and beneficial effects of the disclosure clearer and easier to understand, the disclosure is further elaborated below with reference to the drawings and embodiments. It should be understood that the specific embodiments described herein are only intended to interpret the disclosure instead of limiting the disclosure.

Figure 1:
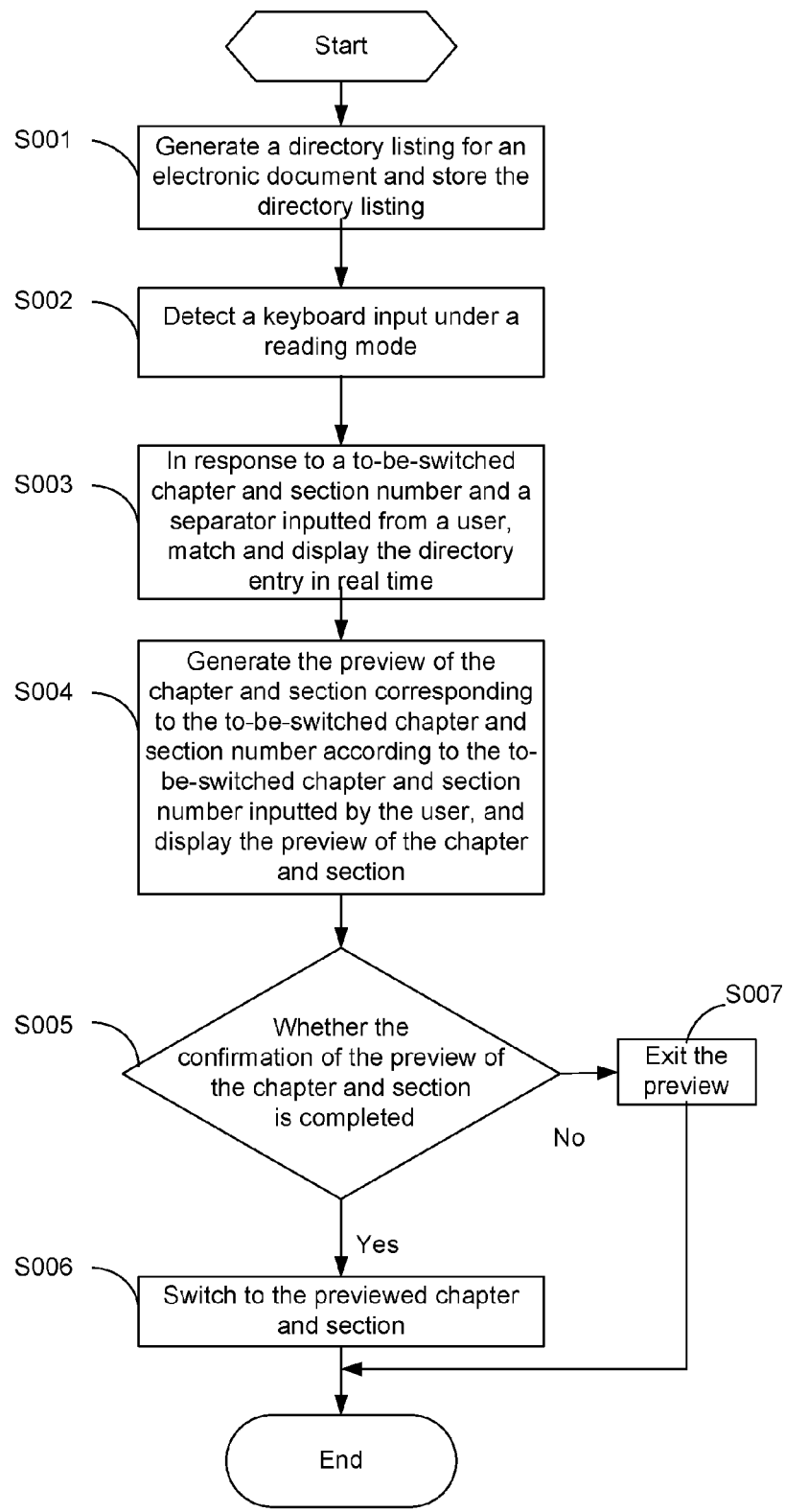
FIG. 1 is a flowchart of a preferred embodiment of a location method for an electronic document in a keyboard type terminal according to the disclosure.

As shown in FIG. 1, FIG. 1 is a flowchart of a preferred embodiment of a location method for an electronic document in a keyboard type terminal according to the disclosure. The embodiment includes the following steps:

S001: A directory listing is generated for an electronic document and the directory listing is stored.

When a user imports the electronic document, the terminal generates and stores the directory listing for the electronic document automatically so that the directory listing can be used by the user in subsequent reading.

The directory listing may be generated by setting a keyword. For example, the keyword is set as: 第*卷, 第*部分, 第*回, 第*章, 第*节, 第*课, 第*集 etc. in a Chinese document, and the keyword is set as: Section *, Chapter * etc. in an English document. Here, * is an Arabic numeral, a Roman numeral, or a number in English (e.g., one, two), or a number in Chinese (e.g., 一, 、). The directory listing may be also generated by other methods, such as a method for generating a directory in a word document. These methods for generating the directory listing are all existing technologies, and are not be elaborated herein.

S002: A keyboard input is detected under a reading interface of a current chapter and section of the electronic document.

S003: In response to a to-be-switched chapter and section number inputted from a user, the to-be-switched chapter and section number is immediately matched with directory entries in the stored directory listing, and the matched directory entry is displayed.

The matched directory entry and all directory entries to which the matched directory entry is belonged are displayed together to the user in a form of a list. When a large number of directory entries need to be displayed, the content in the listing may be displayed in the form of scrolling. Moreover, in the listing, the matched directory entry is in an available state, and all directory entries to which the matched directory entry is belonged are in an unavailable state. At the moment, the chapter and section which is read currently is displayed in gray scale, and the lightness of the listing is displayed on an upper layer of the chapter and section which is read currently.

In the disclosure, the format of the to-be-switched chapter and section number may be a number (such as 1, 2), a combination of numbers (such as 11, 23), a combination of a letter and a number (such as S1, J1), a combination of a symbol and a number (such as <1), or a combination of a symbol and a letter (such as <J). The format of the to-be-switched chapter and section number is a number or a combination of numbers by default. Other formats may be preset and used by the user according to a specific directory listing of a document and a usage habit of the user.

In the step, the user needs to input a separator between a chapter and section number and another chapter and section number to distinguish whether there is one chapter and section number or two chapter and section numbers. The separator is a preset punctuation mark, such as a decimal point, a comma or a space character, which may be set by the user according to a usage habit of the user.

A combination of the chapter and section number and the separator inputted by the user may be represented by default as both from a large unit to a small unit in a directory and from a small unit to a large unit. For example, the units of the directory are volume, chapter and section from a large unit to a small unit, if the user inputs 2.1, it is considered that the user needs to search for the first chapter of the second volume and it is also considered that the user needs to search for the second section of the first chapter. The located chapter and section is displayed in an available state. When the inputted chapter and section number calculated from a large unit to a small unit is the same as that calculated from a small unit to a large unit, an identical result may be obtained. For example, the units of the directory are volume, chapter and section from a large unit to a small unit, if the user inputs 2.1.2, the second section of the first chapter of the second volume will be located no matter calculated from a large unit to a small unit or calculated from a small unit to a large unit. When there is only one located chapter and section, the next step is performed directly. When there are multiple located chapters and sections, it needs to wait the user to select a chapter and section from the multiple located chapter and sections manually, and the user can click on a corresponding entry on the screen to enter the next step.

It is assumed that the electronic document is a Chinese document, the directory listing thereof is as follows:

TABLE 1

```
Volume 1xx
    Chapter 1xx
        Episode 1xx
            Section 1xx
        Chapter 2xx
            Episode 1xx
                Section 1xx
                Section 2xx
Volume 2xx
    Chapter 1xx
        Episode 1xx
            Section 1xx
            Section 2xx
        Episode 2xx
            Section 1xx
            Section 2xx
    Chapter 2xx
        Episode 1xx
            Section 1xx
        Episode 2xx
            Section 1xx
            Section 2xx
        Episode 3xx
            Section 1xx
            Section 2xx
```

When the user inputs 1., the smallest unit and the largest unit are the section and the volume respectively by default in the directory listing. At the moment, the first volume and all chapters to which a first section is belonged in the electronic document are displayed, as shown in Table 2.

TABLE 2

```
Volume 1xx
    Chapter 1xx
        Episode 1xx
            Section 1xx
    Chapter 2xx
        Episode 1xx
            Section 1xx
Volume 2xx
    Chapter 1xx
        Episode 1xx
            Section 1xx
        Episode 2xx
```

TABLE 2-continued

```
    Chapter 2xx
        Section 1xx
        Episode 1xx
            Section 1xx
        Episode 2xx
            Section 1xx
        Episode 3xx
            Section 1xx
```

At the moment, in the display above, the first volume and all first sections are in an available state, namely, the underlined volume and sections in Table 2 are in an available state, and all other volume, chapters and episodes to which the "first section" is belonged are displayed in an unavailable state. The user may select an available volume or section through a direction key and an enter key to enter the next step.

When the user continues to input 1.1., which represents both a volume and chapter, and an episode and section in the directory listing by default, the first chapter of the first volume and all volumes and chapters to which a first section of a first episode is belonged in the electronic document are displayed at the moment, as shown in Table 3.

TABLE 3

```
Volume 1xx
    Chapter 1xx
        Episode 1xx
            Section 1xx
    Chapter 2xx
        Episode 1xx
            Section 1xx
Volume 2xx
    Chapter 1xx
        Episode 1xx
            Section 1xx
    Chapter 2xx
        Episode 1xx
            Section 1xx
```

At the moment, in the display above, only the first chapter of the first volume and all first sections are in an available state, namely, all underlined chapter and sections in Table 3 are in an available state, and all other volumes, chapters and episodes are in an unavailable state. The user may select an available chapter or section through the direction key and the enter key to enter the next step.

When the user continues to input 1.1.1., which represents both a chapter, episode and section, and a volume, chapter and episode in the directory listing by default, the first episode of the first chapter of the first volume and all volumes to which a first section of a first episode of a first chapter is belonged in the electronic document are displayed at the moment, as shown in Table 4.

TABLE 4

```
Volume 1xx
    Chapter 1xx
        Episode 1xx
            Section 1xx
Volume 2xx
    Chapter 1xx
        Episode 1xx
            Section 1xx
```

At the moment, in the display above, only the first episode of the first chapter of the first volume and all first sections are in an available state, namely, all underlined episode and sections in the Table 4 are in an available state, and all other volumes, chapters and episode are displayed in an unavailable state. The user may select an available episode or section through the direction key and the enter key to enter the next step.

when the user continues to input 1.1.1.1., which represents both a volume, chapter, episode and section in the directory listing by default, only a first section of a first episode of a first chapter of a first volume in the electronic document is displayed at the moment, as shown in Table 5.

TABLE 5

Volume 1xx
Chapter 1xx
Episode 1xx
Section 1xx

At the moment, in the display above, only the first section is in an available state, namely, the underlined section in the Table 5 are in an available state, and all other volume, chapter and episode are displayed in an unavailable state; and the next step is entered directly.

In other embodiments, a chapter and/or section in an available state may be further highlighted or the state thereof may be displayed by other manners, which will not be enumerated herein.

The user may set whether an input sequence of the to-be-switched chapter and section number is from a large unit to a small unit in the directory or from a small unit to a large unit according to an option provided by the terminal;

In the step, the number of chapter and section number inputted by the user should be less than or equal to the number of units in the directory of the electronic document. For example, the volume, the chapter and the section are directory units, and the number of chapter and section number inputted by the user should be less than or equal to 3. When the number of chapter and section number inputted by the user is equal to the number of the units in the directory of the electronic document, the user may be reminded through forbidding the input of the user that the input has been completed, or an input error is notified to the user through allowing the user to continue the input while reminding that "there is no corresponding chapter and section".

S004: A preview of a chapter and section corresponding to the to-be-switched chapter and section number is generated according to the to-be-switched chapter and section number inputted by the user, and the preview of the chapter and section is displayed to the user.

In the step, when the input of the user is completed, it needs to be determined, according the number of directory entries which are matched finally in S003, whether to generate the preview directly or to wait for selection of the user. If only one directory entry is matched in S003, the preview of a chapter and section corresponding to the directory entry is generated directly and displayed to the user. If two or more directory entries are matched in S003, it waits the user to select a to-be-switched chapter and section, and after the user makes the selection, the preview of the selected chapter and section is generated and displayed to the user.

The preview of the chapter and section includes the title of the chapter and section and the content of a preset part excerpted from the chapter and section. The user may set, as needed, a paragraph extracted from the content of the preview of the chapter and section.

FIG. 2 is a diagram illustrating the preview of a certain first chapter in an electronic document of the disclosure. FIG. a is a diagram illustrating the preview of the first paragraph excerpted from the chapter, FIG. b is a diagram illustrating the preview of a middle paragraph excerpted from the chapter and FIG. c is a diagram illustrating the preview of the last paragraph excerpted from the chapter.

S005: It is judged whether the user completes the confirmation of the to-be-switched chapter and section within a preset period of time; if yes, S006 is executed; otherwise, S007 is executed.

S006: The previewed chapter and section is switched to and displayed, and the chapter and section switchover is ended.

S007: The preview is exited, the reading interface of the current chapter and section is returned to and the chapter and section switchover is ended.

Figure 3:
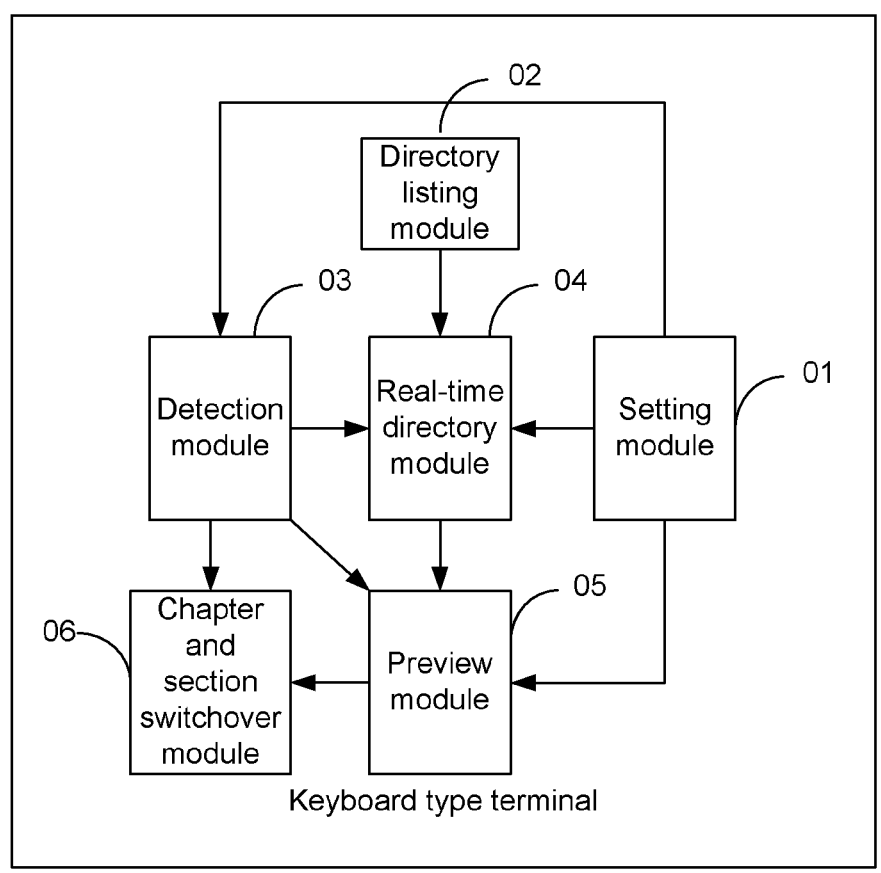
FIG. 3 is a functional block diagram of a preferred embodiment of a keyboard type terminal according to the disclosure.

FIG. 3 shows a functional block diagram of a preferred embodiment of a touch screen terminal of the disclosure, which includes: a setting module 01, a directory listing module 02, a detection module 03, a real-time directory module 04, a preview module 05 and a chapter and section switchover module 06.

The setting module 01 is configured to set a format and an input sequence for a to-be-switched chapter and section number, a separator, and a source of an excerpt from a preview for the user, and provide an interface and an option of a preset period of time for the user.

The directory listing module 02 is configured to generate a directory listing for an electronic document and store the directory listing.

The detection module 03 is configured to: detect a keyboard input, and after the to-be-switched section number is inputted, judge whether the user completes the confirmation of the to-be-switched chapter and section within a preset period of time.

The real-time directory module 04 is configured to, in response to the to-be-switched chapter and section number inputted from the user, immediately matching the to-be-switched chapter and section number with directory entries in the stored directory listing, and display the matched directory entry and all directory entries to which the matched directory entry is belonged together to the user in the form of a static or scrollable list.

The preview module 05 is configured to, when the input of the to-be-switch chapter and section number is completed, determine the number of directory entries matched by the real-time directory module 04, and when one directory entry is matched by the real-time directory module 04, directly generate a preview of a chapter and section corresponding to the directory entry and display the preview of the chapter and section to the user; and when two or more directory entries are matched by the real-time directory module 04, wait the user to select a chapter and section, and in response to the selection of the user, generate the preview of the selected chapter and section and display the preview of the selected chapter and section to the user.

The chapter and section switchover module 06 is configured to, in response to a confirmation of switching to the chapter and section from the user, switch to the chapter and section previewed by the preview module 05.

The above description illustrates and describes preferable embodiments of the disclosure. As previously mentioned, however, it should be understood that the disclosure is not restricted to the form disclosed by the present document and should not be regarded as exclusion of other embodiments, but can be used to various other combinations, modifications and environments and can be modified according to the above teaching or technologies or knowledge of related fields within the scope of conception of the disclosure described in the present document. Furthermore, modifications and changes made by those skilled in the art without departing from the spirit and principle of the disclosure shall fall within the scope of protection of the claims of the disclosure.

INDUSTRIAL APPLICABILITY

By means of the method of the disclosure, a user can accurately locate a desired section and read the section without setting a bookmark and without searching for the section by browsing a directory, thus greatly improving reading experience.

The invention claimed is:

1. A location method for an electronic document in a keyboard type terminal, comprising:
   generating a directory listing for an electronic document, and storing the directory listing;
   detecting a keyboard input under a reading interface of a current chapter and section of the electronic document;
   in response to at least part of a to-be-switched chapter and section number inputted from a user, immediately matching the at least part of the to-be-switched chapter and section number with directory entries in the stored directory listing, and displaying the matched directory entry;
   generating a preview of a chapter and section corresponding to the to-be-switched chapter and section number according to the at least part of the to-be-switched chapter and section number inputted by the user, and displaying the preview to the user; and
   in response to a confirmation of switching to the chapter and section from the user, switching to the previewed chapter and section,
   wherein the step of generating the preview of the chapter and section corresponding to the to-be-switched chapter and section number according to the at least part of the to-be-switched chapter and section number inputted by the user and displaying the preview of the chapter and section to the user, comprises:
   determining the number of matched directory entries according to the at least part of the to-be-switched chapter and section number; when there is one matched directory entry, generating a preview of a chapter and section corresponding to the directory entry and displaying the preview of the chapter and section to the user; when there are two or more matched directory entries, waiting the user to select a to-be-switched chapter and section from the matched directory entries, and in response to the selection of the user, generating a preview of the selected chapter and section and displaying the preview of the selected chapter and section to the user,
   wherein the directory listing is composed of directory entries of multiple levels, and the chapter and section number is represented as the following: a number of a highest-level directory entry to which the chapter and section is belonged, a number of a second-highest-level directory entry to which the chapter and section is belonged, . . . , and a number of a lowest-level directory entry to which the chapter and section is belonged; and
   wherein a default input sequence of the at least part of the to-be-switched chapter and section number inputted by the user is represented by default as both from the highest-level directory entry to the lowest-level directory entry in the directory listing and from the lowest-level directory entry to the highest-level directory entry; when the user inputs the at least part of the to-be-switched chapter and section number, treating the first number of the at least part of the to-be-switched chapter and section number as the number of the highest-level directory entry to which the chapter and section is belonged, and immediately matching the at least part of the to-be-switched chapter and section number with directory entries in the stored directory listing; and treating the first number of the at least part of the to-be-switched chapter and section number as the number of the lowest-level directory entry to which the chapter and section is belonged, and immediately matching the at least part of the to-be-switched chapter and section number with directory entries in the stored directory listing.

2. The method according to claim 1, wherein the chapter and section number takes a format of one of the following: a number, a combination of numbers, a combination of a preset letter and a number, a combination of a preset symbol and a number, or a combination of a preset symbol and a preset letter.

3. The method according to claim 1, wherein when a plurality of at least parts of to-be-switched chapter and section numbers, a separator is provided between each at least part of to-be-switched chapter and section number and other at least parts of to-be-switched chapter and section numbers.

4. The method according to claim 3, wherein the separator is a preset punctuation mark or a space character.

5. The method according to claim 1, further comprising: when the generated preview is displayed to the user,
   judging whether the user completes the confirmation of the to-be-switched chapter and section within a preset period of time; and when no confirmation of the to-be-switched chapter and section is received from the user within the preset period of time, ending the preview and returning to the reading interface of the current chapter and section.

6. The method according to claim 1, wherein the step of in response to a to-be-switched chapter and section number inputted from a user, immediately matching the to-be-switched chapter and section number with directory entries in the stored directory listing, and displaying the matched directory entry, comprises: displaying the matched directory entry and all upper levels of directory entries to which the matched directory entry is belonged to the user in a form of a list.

7. The method according to claim 6, further comprising: setting the matched directory entry as an available state, and setting all upper levels of directory entries to which the matched directory entry is belonged as an unavailable state.

8. The method according to claim 6, wherein the directory listing is displayed to the user in a scrollable form.

9. The method according to claim 1, wherein the preview of the chapter and section includes a title of the chapter and section, and content of a default paragraph excerpted from the chapter and section or a paragraph preset by the user.

10. The method according to claim 2, wherein when a plurality of at least parts of to-be-switched chapter and section numbers, a separator is provided between each at least part of to-be-switched chapter and section number and other at least parts of to-be-switched chapter and section numbers.

11. The method according to claim 10, wherein the separator is a preset punctuation mark or a space character.

12. A keyboard type terminal, comprising: a directory listing module, a detection module, a real-time directory module, a preview module and a chapter and section switchover module, wherein the directory listing module is configured to generate a directory listing for an electronic document and store the directory listing;

the detection module is configured to detect a keyboard input;

the real-time directory module is configured to, in response to at least part of a to-be-switched chapter and section number inputted from a user, immediately match the at least part of the to-be-switched chapter and section number with directory entries in the stored directory listing, and display the matched directory entry;

the preview module is configured to generate a preview of a chapter and section corresponding to the at least part of the to-be-switched chapter and section number according to the to-be-switched chapter and section number inputted by the user, and display the preview of the chapter and section to the user; and the chapter and section switchover module is configured to, in response to a confirmation of switching to the chapter and section from the user, switch to the chapter and section previewed by the preview module, wherein the preview module is further configured to judge the number of directory entries matched by the real-time directory module; and when one directory entry is matched by the real-time directory module, directly generate a preview of a chapter and section corresponding to the directory entry and display the preview of the chapter and section to the user, and when two or more directory entries are matched by the real-time directory module, wait the user to select a to-be-switched chapter and section from the matched directory entries, and in response to the selection of the user, generate the preview of the selected chapter and section and display the preview of the selected chapter and section to the user, wherein the directory listing is composed of directory entries of multiple levels, and the chapter and section number is represented as the following: a number of a highest-level directory entry to which the chapter and section is belonged, a number of a second-highest-level directory entry to which the chapter and section is belonged, . . . , and a number of a lowest-level directory entry to which the chapter and section is belonged; and wherein a default input sequence of the at least part of the to-be-switched chapter and section number inputted by the user is represented by default as both from the highest-level directory entry to the lowest-level directory entry in the directory listing and from the lowest-level directory entry to the highest-level directory entry; when the user inputs the at least part of the to-be-switched chapter and section number, treating the first number of the at least part of the to-be-switched chapter and section number as the number of the highest-level directory entry to which the chapter and section is belonged, and immediately matching the at least part of the to-be-switched chapter and section number with directory entries in the stored directory listing; and treating the first number of the at least part of the to-be-switched chapter and section number as the number of the lowest-level directory entry to which the chapter and section is belonged, and immediately matching the at least part of the to-be-switched chapter and section number with directory entries in the stored directory listing.

13. The keyboard type terminal according to claim 12, further comprising: a setting module configured to set a format and an input sequence for the to-be-switched chapter and section number, a separator, and a source of an excerpt from the preview for the user, and provide an interface and an option of a preset period of time for the user.

14. The keyboard type terminal according to claim 12, wherein the detection module is configured to, after the at least part of the to-be-switched chapter and section number is inputted, judge whether the user completes the confirmation of the to-be-switched chapter and section within the preset period of time.

15. The keyboard type terminal according to claim 13, wherein the detection module is configured to, after the at least part of the to-be-switched chapter and section number is inputted, judge whether the user completes the confirmation of the to-be-switched chapter and section within the preset period of time.

* * * * *